United States Patent [19]

Ambrico et al.

[11] 3,809,947

[45] May 7, 1974

[54] SINE WAVE DEFLECTION SYSTEM FOR CORRECTING PINCUSHION DISTORTION

[75] Inventors: Louis Edward Ambrico, Hyde Park; Stavros George Katsafouros, Saugerties; Bergert George Kleen; William Roger Lamoureux, both of Kingston, all of N.Y.

[73] Assignee: International Business Machines Corporation, Armonk, N.Y.

[22] Filed: Dec. 17, 1971

[21] Appl. No.: 209,234

[52] U.S. Cl. .......... 315/27 GD

[51] Int. Cl. .......... H01j 29/70

[58] Field of Search .......... 315/26, 27 R, 27 TD, 28, 315/29, 27 GD

[56] References Cited

UNITED STATES PATENTS

| | | | |
|---|---|---|---|
| 3,439,220 | 4/1969 | Katagiri et al. | 315/29 |
| 3,678,331 | 7/1972 | Fischman | 315/27 TD |
| 3,417,283 | 12/1968 | Freeborn | 315/27 R |

*Primary Examiner*—Maynard R. Wilbur
*Assistant Examiner*—J. M. Potenza
*Attorney, Agent, or Firm*—J. Jancin, Jr.; Joscelyn G. Cockburn

[57] ABSTRACT

A capacitor and a deflection winding form a parallel resonant tank circuit for providing a steady state sinusoidal current flow in the deflection winding. When used for deflection of the electron beam of a cathode ray tube, a substantially linear portion of the waveform of the sinusoidal current flowing in the deflection winding may be used to move the electron beam from left to right across the screen during the "trace" interval. The remainder of the waveform of the sinusoidal current may be used for "retrace." Since the tank circuit requires only periodic energization to sustain steady state sinusoidal current flow, current consumption is held to a minimum. An S portion of the waveform of the sinusoidal current may be used during the trace interval to correct for the pincushion distortion that would otherwise occur when cathode ray tubes having large deflection angles are used.

4 Claims, 5 Drawing Figures

SINE WAVE DEFLECTION SYSTEM FOR CORRECTING PINCUSHION DISTORTION

BACKGROUND OF THE INVENTION

1. Field of the Invention

This invention relates to low power circuits for providing electromagnetic deflection of an electron beam, and, more particularly, to circuits in which a continuous sinusoidal current is utilized in a deflection coil.

2. Description of the Prior Art

In apparatus requiring linear scanning with an electron beam, it has been a common practice to apply a voltage across an inductive element, said element commonly being referred to as a deflection winding, coil, or yoke. Because of the inductive nature of the winding, the application of a fixed voltage thereto initially results in a substantially linearly increasing current flow in the winding which has the shape of a ramp. The changing magnetic field established by this winding in response to this current ramp serves to deflect the electron beam in a linear manner. Thus, if the electron beam and the current flow in the winding begin at approximately the same time and if the beam is initially positioned at a reference point, the beam may be linearly deflected from this reference point by the changing magnetic field established by the substantially linearly increasing current flow through the winding.

In electromagnetically deflecting the electron beam in cathode ray tubes, it is common for the beam to be deflected to the left-hand side of the tube (as viewed from the front of its face) when the current ramp through the deflection winding is at its maximum negative magnitude. Accordingly, the electron beam is deflected to the right-hand side of the tube when the current ramp is at its maximum positive magnitude. When the current ramp is at its maximum positive magnitude, circuitry is ordinarily provided to remove the voltage supply from the deflection winding and quickly restore the winding to its maximum negative current flow condition so that a new ramp may be begun for a new left-to-right deflection of the electron beam. The current flow through the deflection winding for a plurality of scans of the electron beam, therefore, has a substantially sawtoothed waveform.

With modern, compact, cathode ray tubes having large deflection angles, a problem of pincushion distortion has been encountered in attempts to accurately display information on the cathode ray tube. This problem has been substantialy lessened by the addition of capacitance in the deflection winding circuit to alter the substantially linear ramp of current into an S shape.

Perhaps the greatest problem in electron beam scanning, and particularly in relatively high speed scanning, has been the large amount of power required for such scanning systems. For example, in conventional television receivers most of the total power consumed in the receiver is consumed in the horizontal scanning system for the cathode ray tube. It is, therefore, appropriate to consider the characteristics of other methods and apparatus for electromagnetic scanning than those utilizing a sawtoothed current in the deflection winding.

Where a slower restoration time is permissable for restoring the deflection winding to its maximum negative current flow condition for beginning a new left-to-right deflection, it has heretofore been proposed to provide a sinusoidal current flow rather than a ramp current through the deflection winding. In such a system, the electron beam may be unblanked during the substantially increasing portion of the sinusoidal current waveform, then blanked before the waveform reaches its positive peak, and again unblanked after the waveform passes through its negative peak. Utilizing this approach, the beam, while active, is deflected during a substantially linear increase of current through the deflection winding. In this system, as well as in a system using a sawtoothed current through the deflection winding, the problem of high power consumption remains present.

OBJECTS OF THE INVENTION

It is, therefore, an object of this invention to reduce the power required to deflect an electron beam to a lower level than has heretofore been possible.

It is a further object of this invention to deflect an electron beam in a more efficient and inexpensive manner.

It is a further object of this invention to more efficiently deflect an electron beam while, simultaneously, overcoming pincushion distortion.

SUMMARY OF THE INVENTION

These and other objects are accomplished by providing a parallel resonant tank circuit comprising a deflection winding and a capacitor. The tank circuit is periodically energized by a DC voltage supply means to produce a steady state sinusoidal current flow through said deflection winding and said capacitor. In one embodiment, the electron beam is unblanked during that portion of the sinusoidal current waveform when the current through the deflection winding is increasing at a substantially linear rate. This substantially linear increase of current approximates a ramp, and as the ramp current increases through the deflection winding, the electron beam is deflected from a reference position to a fully deflected position. At the fully deflected position the electron beam is blanked and remains blanked until the sinusoidal waveform progresses to the point at which current flow through the deflection winding again begins to substantially linearly rise. At this latter point the beam is again unblanked. The trace portion of the sinusoidal current waveform is, thus, defined as the portion of the waveform during which the electron beam is unblanked. The retrace portion of the sinusoidal current waveform is defined as the portion of the waveform during which the beam is blanked.

The tank circuit must be periodically energized by the DC voltage supply means to maintain the sinusoidal current flow at a steady state value. The tank circuit is periodically energized by closing a switching means when the voltage across said switching means is at a minimum level. At this same time current flow through the tank circuit is also minimum, so power dissipation by the switching means is minimized. Since the circuit must only be periodically energized for short durations to sustain steady state sinusoidal current flow therein, the power required by the tank circuit is also low.

When pincushion distortion occurs in cathode ray tubes having large deflection angles, the amplitude of the sinusoidal current flowing in the deflection winding is adjusted and coordinated with the trace portion of the current waveform so that the current waveform flowing in the deflection winding during the trace period is substantially S shaped.

The foregoing and other objects, features, and advantages of the invention will be apparent from the following more particular description of preferred embodiments of the invention, as illustrated in the accompanying drawings.

DETAILED DESCRIPTION OF THE PREFERRED EMBODIMENTS

Figure 1:
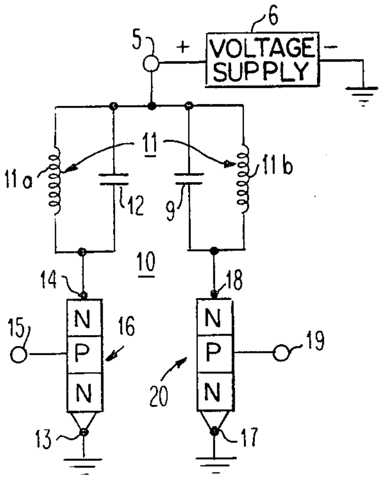
FIGS. 1-3 illustrate embodiments of the parallel resonant tank circuitry and energization circuitry utilized for generating the sinusoidal current flow in the deflection winding.

Referring now to FIG. 1, parallel resonant tank circuit 10 is comprised of a center tapped deflection winding 11 having capacitor 12 in parallel with portion 11*a* of deflection winding 11 and capacitor 9 in parallel with portion 11*b* of deflection winding 11. Terminal 5 is connected to the center tap or midpoint, of deflection winding 11 and to one end of capacitors 12 and 9.

The (+) terminal of DC voltage supply 6 is connected to terminal 5 of tank circuit and 10 and the (−) terminal of voltage supply 6 is grounded. Switch terminal 13 of switching means 16 is grounded and switch terminal 14 of switching means 16 is connected to the end of portion 11*a* of deflection winding 11 opposite the center tap of deflection winding 11. The other terminal of capacitor 12 is also connected to switch terminal 14. Switch terminal 17 is connected to ground and switch terminal 18 is connected to the end of portion 11*b* of deflection winding 11 opposite the center tap of deflection winding 11. The other terminal of capacitor 9 is also connected to switch terminal 18. Switching means 16 and 20 are, therefore, connected to energize tank circuit 10 in a push-pull manner.

For illustration purposes, switching means 16 and 20 are depicted in FIG. 1 by NPN transistors having control or base terminals 15 and 19. If it is desirable to use PNP transistors for switching means 16 and 20, this could be accomplished by reversing the polarity of the output terminals of voltage supply 6. Of course, it is recognized that switching means other than transistors could successfully be utilized for switching means 16 and 20. For example, vacuum tubes, SCR's and many other substantially high speed switching means may be used.

The expression for determining the resonant frequency of a parallel resonant tank circuit is given as follows:

$$f_R = 1/2\pi\ \sqrt{LC}\ \ \sqrt{(R_L^2\,C - L)/(R_C^2\,C - L)}$$

where $f_R$ is the resonant frequency, $L$ is the inductance in Henrys, $C$ is the capacitance in Farads, $R_L$ is the series resistance of the inductor and $R_C$ is the series resistance of the capacitor.

An examination of the fractional expression under the radical sign reveals that there are two distinct possibilities with two different interpretations. If the fractional expression under the radical sign is less than zero, $f_R$ is an imaginary number having no meaning and resonance doe not occur. Contrary to series resonance in which case there is at least one frequency at which the series L-C circuit will resonate, there is no guarantee of resonance in a parallel L-C circuit.

Further examination of the fractional expression under the radical sign reveals that for resonance to occur, both the numerator and the denominator of the fraction must be greater than zero, or, both the numerator and the denominator must be less than zero. Therefore, to guarantee resonance of the tank circuit, care must be taken in choosing a deflection winding and capacitors so that $L$, $R_L$, $C$ and $R_C$ result in a positive fractional expression under the radical sign.

Figure 2:
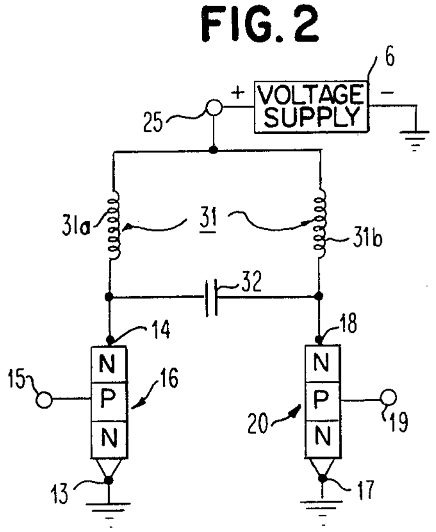

Instead of individually turning each portion of deflection winding 11 with a separate capacitor as in FIG. 1, the tuning scheme in FIG. 2 may be used, in which case one capacitor of one fourth the capacitance of capacitor 12 or 9 may be used. In FIG. 2, deflection winding 31 is identical to deflection winding 11 in FIG. 1. Because of the mutual inductance between protions 31*a* and 31*b* of deflection winding 31, the equivalent inductance of deflection winding 31 is four times the inductance of portion 31*a* or 31*b* of deflection winding 31. Thus, where the equivalent inductance of the entire deflection winding is four times as great as it is for one of the two equal portions of deflection winding 31, for the same resonant frequency as that in tank circuit 10, capacitor 32 may be one fourth the capacitance of capacitor 12 or 9. In tank circuit 31 the component count is lessened by one capacitor and the component size is lessened by the ability to use a smaller capacitorfor the same resonant frequency. In FIG. 2, switching means 16 and 20 are connected the same as in FIG. 1 and have identical functions. Voltage supply 6 is connected to terminal 25 of tank circuit 30 and to ground in the same manner as it is connected in FIG. 1.

Figure 3:
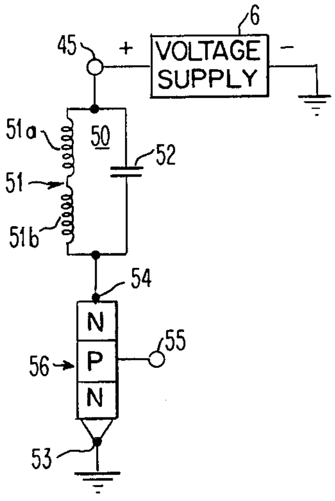

In FIG. 3, parallel resonant tank circuit 50 is energized in a single ended manner. Tank circuit 50 is comprised of deflection winding 51 and capacitor 52. Deflection winding 51 may be identical to deflection windings 11 and 31 and includes portions 51*a* and 51*b*. Because of the mutual inductance between portions 51*a* and 51*b*, the total inductance of deflection winding 51 is four times the inductance of either portion 51*a* or portion 51*b*. Capacitor 52 may, therefore, be one fourth the volume of capacitance that would be required if separate capacitors were placed in parallel across portions 51*a* and 51*b* for the same resonant frequency. If deflection winding 51 is identical to deflection winding 31, capacitor 52 may be identical to capacitor 32. Terminal 45 connects tank circuit 50 to the (+) terminal of voltage supply 6. The other end of tank circuit 50 is connected to switch terminal 54 of switching means 56. Switch terminal 53 of switching means 56 is connected to ground so that when the necessary control signal is applied to control or base terminal 55 of switching means 56, tank circuit 50 will be connected to be energized by voltage supply 6.

If switching means 56 is rendered conductive to enable tank circuit 50 to be energized by voltage supply 6, the voltage across capacitor 52 will begin to rise while the current flowing in winding 51 will begin to rise. After some time has elasped, if switching means 56 is rendered nonconductive, tank circuit 50 will oscillate at its resonant frequency until the energy stored therein has been dissipated. The voltage appearing across the tank circuit (between terminals 45 and 54) and current flow through deflection winding 51 and capacitor 52 will all have a sinusoidal waveform. Since the voltage across an inductor leads the current flowing through the inductor by 90°, the sinusoidal voltage waveform appearing across terminals 45 and 54 will lead the current flowing through deflection winding 51 by 90°.

In order to sustain a steady state sinusoidal current flow through tank circuit 50, it is necessary to periodically render switching means 56 conductive for a short period of time and then nonconductive for long periods of time. In order to keep power dissipation low in switching means 56, it is advantageous to render switching means 56 conductive when the voltage across switch terminals 53 and 54 is at a minimum. The time during which the voltage across switch terminals 53 and 54 is minimum is the time during which the voltage across terminals 45 and 54 is at a maximum. Since the sinusoidal voltage across terminals 45 and 54 leads the current flowing in deflection winding 51 by 90° (and lags the current flowing through capacitor 52 by 90°) current flow through capacitor 52 and deflection winding 51 is at zero when the voltage across terminals 45 and 54 is at a maximum. This is the most advantageous time to render switching means 56 conductive for a short time and then nonconductive since current flow through either the capacitive or the inductive branch of tank circuit 50 is at a minimum and the voltage across switch terminals 53 and 54 is at a minimum.

Tank circuit 50 in FIG. 3 will produce a reasonably steady state sinusoidal current flow through deflection winding 51 if switching means 56 is rendered conductive near the negative peak of the sinusoidal voltage waveform across switch terminals 53 and 54. The result is that tank circuit 50 is energized once for a short time during each period of oscillation at its resonant frequency. It is energized at a point when current flow through the inductive and capacitive elements of the tank circuit is at a minimum and when the voltage across switching means 56 is at a minimum to insure low power dissipation by switching means 56.

The sinusoidal current flowing through deflection winding 51 produces a changing magnetic field around winding 51 which may be used to deflect an electron beam which passes through this changing magnetic field. Typically, the electron beam is unblanked, (allowed to pass through the magnetic field produced by deflection winding 51) at a time when the waveform of the sinusoidal current passing through winding 51 is substantially linearly rising. The sinusoidal waveform begins a substantially linear rise after the waveform has passed through a negative peak and continues a substantially linear rise until a short time before the sinusoidal waveform passes through a positive peak. During this substantially linear rise of current through deflection winding 51, the unblanked electron beam passing through the magnetic field produced by winding 51 is deflected in the same manner in which it would be deflected if the ramp portion of a sawtoothed current were passing through winding 51.

Thus, the electron beam is substantially linearly deflected and this portion of the waveform during which the unblanked beam is substantially linearly deflected may be defined as the trace portion of the waveform. As the sinusoidal current waveform nears a positive peak the waveform begins to become nonlinear and the electron beam may be blanked at this time. As current continues to flow in winding 51, the sinusoidal waveform of this current passes through a positive peak, then through zero, then through a negative peak, and finally again begins to rise. Throughout this progression of the current through winding 51, the waveform of this current continues to have a substantially sinusoidal shape. After the waveform passes through the negative peak and begins a substantially linear rise toward a positive peak, the electron beam may again be unblanked and remain unblanked until the sinusoidal current waveform nears the positive peak. The retrace portion of the sinusoidal current waveform is defined as that portion of the waveform which begins when the electron beam is blanked before the positive peak and which ends when the electron beam is unblanked after the negative peak.

The trace portion of the sinusoidal current waveform includes less than 50 percent of the period and the retrace portion of the waveform includes more than 50 percent of the period. For this reason, when the deflection winding is used to deflect an electron beam in a cathode ray tube for display purposes, it is advantageous to select a cathode ray tube having substantially long persistence phosphors on the tube screen, since this type of deflection results in a relatively long retrace time compared to the sawtoothed current waveform typically utilized in the deflection winding in television receivers. Of course these percentages of trace and retrace times apply only when one scan in one direction is made of the electron beam during each period of sinusoidal current flow through the deflection winding. If a second scan were made in the opposite direction during the remaining portion of each period, the total trace time per period would be large compared to the retrace time.

A great advantage in generating a steady state sinusoidal current in the deflection winding and using the magnetic field produced thereby for deflection is the fact that a very small amount of power is required in the periodic energization of the tank circuit to maintain sinusoidal current flow through the deflection winding. Further, this energization can be made to occur at a time when very low power dissipation takes place in the switching means for energizing the tank circuit.

Another feature of sine wave deflection is the fact that the amplitude of the sinusoidal current waveform may be chosen so that the trace portion of the waveform is substantially S shaped rather than substantially linear. For a given resonant frequency, if the trace portion is substantially linear with a relatively high amplitude sinusoidal current waveform a trace portion of the same duration will be substantially S shaped if the amplitude of the sinusoidal current waveform is lowered. When the deflection system of this invention is being used to deflect an electron beam in a cathode ray tube having a large deflection angle, pincushion distortion may be corrected by adjusting the amplitude of the sinusoidal current waveform so that the trace portion of the waveform is S shaped.

As stated above, tank circuit 50 in FIG. 3 will produce a reasonably steady state sinusoidal current flow through deflection winding 51 if switching means 56 and voltage supply 6 are utilized once during each period of oscillation to energize the tank circuit. Since there is only one time per period of oscillation at which the voltage across switcing means 56 is at a minimum, tank circuit 50 may be energized only one time during each period of oscillation if switching means 56 is chosen to have low power dissipation capabilities. Tank circuits 10 and 31 are designed to be driven in a push-pull configuration and there are two times per period of the sinusoidal current waveform when voltage is at a minimum across a switching means while current in the tank circuits is passing through zero.

Figure 4:
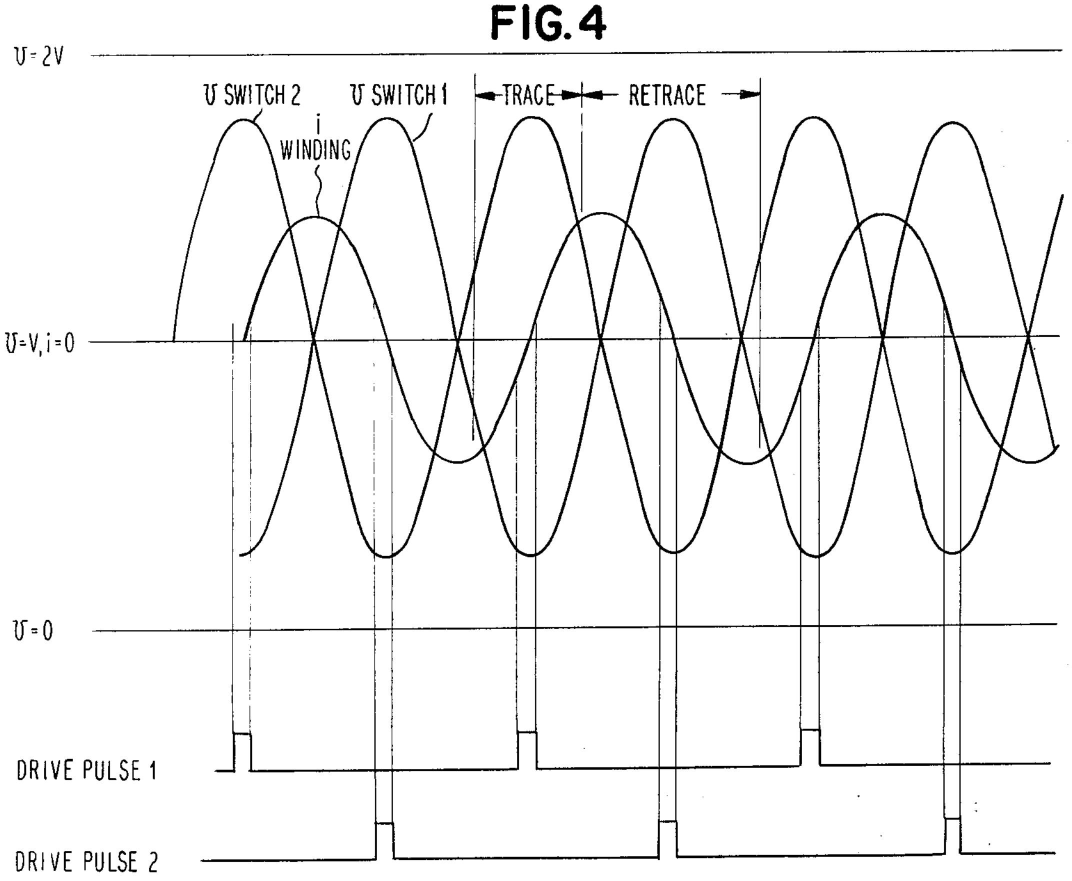
FIG. 4 is a series of voltage and current waveforms applicable to the deflection circuits of FIGS.1 and 2 for providing sine wave deflection.

In FIG. 4, $i_{winding}$ is the steady state sinusoidal waveform of the current flowing through deflection winding 11 or 31 after the tank circuits have been energized a number of times. Waveforms $v_{switch\ 1}$ and $v_{switch\ 2}$ are waveforms of the voltage across switching means 16 and 20. Whether $v_{switch\ 1}$ is the waveform across switching means 16 or switching means 20 is dependent upon which of the two switching means was closed and opened first to initiate oscillation in the tank circuit. V is the maximum DC voltage produced by supply means 6. Below these sinusoidal waveforms pulse trains depicted as Drive Pulse 1 and Drive Pulse 2 are the drive pulses or control signals to be applied to conrol terminals 15 and 19 of switching means 16 and 20 for rendering these switching means conductive.

It should be noted in FIG. 4 that when $v_{switch\ 1}$ is at a minimum, $i_{winding}$ is also passing through 0. Immediately, before this time, drive pulse 1 renders a switching means conductive and holds it conductive until just past this time. During this time, tank circit 10 or 30 is energized by voltage supply 6. At the next time that $i$ winding is passed through zero, $v_{switch\ 2}$ is also passing through a minimum. Just before this time, drive pulse 2 renders the other switching means conductive and holds it conductive until just after this time, thereby again energizing tank circuit 10 or 30 by voltage supply 6. Thus, tank circuits 10 and 30 may be energized twice during each period of $i_{winding}$ to yield a more nearly perfect, steady state sinusoidal current waveform than if the tank circuits were energized only once during each period.

Typical trace and retrace portions of $i_{winding}$ are shown in FIG. 4. It will be noted that $i_{winding}$ is passing through zero during a trace portion and that the tank circuit is energized during this time. Because the pulse width of the drive pulses (and therefore the duration of energization) is short compared to the trace portion of $i_{winding}$, we have found that only a small amount of deflection distortion of the electron beam occurs when the tank circuit is energized during a trace portion of $i_{winding}$. When it is desirable to minimize this deflection distortion, tank circuit 10 should be used. Very short energization times may be used with tank circuit 10 since the impedance of the load placed across voltage supply 6 during energization is low. This low impedance results from the use of separate capacitors 12 and 9 which are approximately four times the capacitance of capacitor 32 in tank circuit 30. This shorter energization time that may be used with tank circuit 10 has a less disturbing effect to the waveform of $i_{winding}$ than does the longer energization time which must be used with tank circuit 30.

If component savings is desirable, at the expense of slightly more deflection distortion, tank circuit 30 is recommended since capacitor 32 is the only capacitor required and it is approximately one fourth the capacitance of capacitor 12 or 9.

OPERATION

Figure 5:
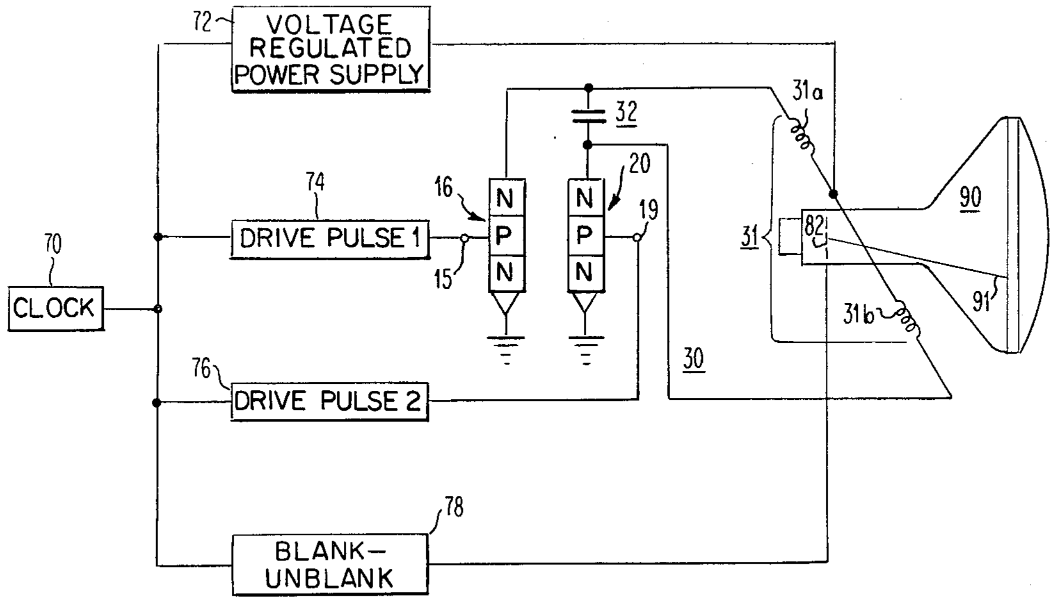
FIG. 5 is a block diagram embodying a sine wave deflection system of this invention.

The block diagram of a deflection system for cathode ray tube 90 is shown in FIG. 5. Tank circuit 30, also shown in FIG. 2, is used to provide a sinusoidal current flow through portions 31*a* and 31*b* of deflection winding 31 to electromagnetically deflect electron beam 91 in cathode ray tube 90. Voltage regulated power supply 72 is used to periodically energize tank circuit 30. This periodic energization occurs as Drive Pulses 1 and 2, produced by pulse means 74 and 76, are applied to control terminals 15 and 19 of switching means 16 and 20. These drive pulses are synchronized by clock means 70.

Clock means 70 is also connected to power supply 72 to synchronize with the deflection circuitry any noise and ripple produced by power supply 72. By synchronizing the power supply in this manner, any ripple or noise in the deflection circuitry will appear as stationary distortion on the face of tube 90, rather than distortion which wanders around on the face of tube 90.

Blank-unblank means 78 is connected to grid 82 of tube 90 for biasing grid 82 to unblank beam 91 during trace and blank beam 91 during retrace. Blank-unblank means 78 is synchronized with the changing magnetic field produced by deflection winding 31, since blank-unblank means 78 is also synchronized with clock means 70.

We have found this system to be particularly useful for horizontal scanning in a cathode ray tube display apparatus. A stator wound deflection winding having an inductance of 1.2 millihenrys is used in the tank circuit with a single 0.9 microfarad capacitor. Because of the mutual inductance between the two portions of the deflection winding, the equivalent inductance of the winding is 4.8 millihenrys. The series resistance of the deflection winding of the coil is approximately 7 ohms and the series resistance of the capacitor is approximately 0.1 ohms. The tank circuit is driven in the push-pull configuration shown in FIG. 3 and is resonant at approximately 2.5 KHz. Of course slightly different values of series resistances would yield approximately the same resonant frequency, and different values of capacitance and inductance would yield different resonant frequencies. The tank circit is energized by a 30 volt regulated DC power supply for a 30 microsecond duration at each zero crossing of the sinusoidal current flowing in the detection winding. Since, at this energization, time, voltage across the switching means is at a minimum, total power dissipation in this horizontal scanning system is 2.7 watts.

While the invention has been particularly shown and described with reference to the preferred embodiments thereof, it will be understood by those skilled in the art that the foregoing and other changs in form and details may be made therein without departing from the spirit and scope of the invention.

What is claimed is:

1. A current electromagnetic deflection system for producing a periodic sinusoidal deflection current, with each period of said sinusoidal deflection current having a substantially S shaped trace portion for deflecting an electron beam, said current electromagnetic deflection system comprising:

a voltage supply means having positive and negative terminals;

a switching means having at least two terminals, one of said terminals of said switching means being connected to one of said terminals of said voltage supply means;

a deflection winding being connected between another terminal of said switching means and the other terminal of said voltage supply means;

a capacitor connected across said deflection winding forming a resonant tank circuit for providing a steady state sinusoidal current flow through said deflection winding and said capacitor when said resonant tank circuit is energized by periodically closing and opening said switcing means, whereby the substantially S shaped trace portion of said current flow through said winding produces a magnetic field to deflect said electron beam.

2. The electromagnetic deflection system of claim 1, further comprising:

a cathode ray tube for generating said electron beam;

said deflection winding being positioned in spaced relation to said cathode ray tube for deflecting said electron beam.

3. A current electromagnetic deflection system for producing a periodic sinusoidal deflection current, with each period of said sinusoidal deflection current having a substantially S shaped trace portion for deflecting an electron beam, said current electromagnetic deflection system comprising:

a voltage supply means having positive and negative terminals;

a pair of switching means, each of said switching means having at least two terminals, one of said terminals of each of said switching means being connected to one of said terminals of said voltage supply means;

a deflection winding having end terminals and a center tap terminal, said center tap terminal being connected to the other terminal of said voltage supply means, one of said end terminals being connected to another terminal of one of said pair of switching means, and the other of said end terminals being connected to another terminal of the other of said pair of switching means;

a capacitor connected between said center tap terminal of said deflection winding and an end terminal of said deflection winding and another capacitor connected between the center tap terminal of said deflection winding and the other end terminal of said deflection winding forming a resonant tank circuit for providing a steady state sinusoidal current flow through said deflection winding when said tank circuits are energized by periodically closing and opening said switching means, whereby the substantially S shaped trace portion of said current flow through said winding produces a magnetic field to deflect said electron beam.

4. A cathode ray tube display system comprising:

a voltage supply means having positive and negative terminals;

a pair of switching means each of said switcing means having at least two terminals, one of said terminals of each of said switching means being connected to one of said terminals of said voltage supply means;

a resonant tank circuit including a deflection winding, said resonant tank circuit being connected between another terminal of said switching means and the other terminal of said voltage supply means, said resonant tank circuit providing a steady state sinusoidal current flow through said deflection winding when said resonant tank circuit is energized by periodically closing and opening said switching means;

said deflection winding being positioned relative to said cathode ray tube for deflecting an electron beam generated in said cathode ray tube when said sinusoidal current is flowing in said deflection winding;

blank-unblank means for allowing said electron beam to reach the face of said cathode ray tube during a substantially S shaped portion of the waveform of said sinusoidal current and inhibiting the electron beam from reaching the face of said cathode ray tube during another portion of the waveform of said sinusoidal current flowing in said deflection winding.

* * * * *